US011148615B2

(12) United States Patent
Husek et al.

(10) Patent No.: US 11,148,615 B2
(45) Date of Patent: Oct. 19, 2021

(54) FIXED WINDOW ASSEMBLY FOR A VEHICLE AND METHOD OF MANUFACTURING SAME

(71) Applicant: Henniges Automotive Sealing Systems North America, Inc., Wilmington, DE (US)

(72) Inventors: Petr Husek, Mlada Boleslav (CZ); Daniel Slavik, Bela pod Bezdezem (CZ); Achim Grüter, Brueggen (DE)

(73) Assignee: Henniges Automotive Sealing Systems North America, Inc., Auburn Hills, MI (US)

( * ) Notice: Subject to any disclaimer, the term of this patent is extended or adjusted under 35 U.S.C. 154(b) by 201 days.

(21) Appl. No.: 15/381,907

(22) Filed: Dec. 16, 2016

(65) Prior Publication Data

US 2017/0100996 A1    Apr. 13, 2017

Related U.S. Application Data

(63) Continuation-in-part of application No. PCT/US2016/038373, filed on Jun. 20, 2016.
(Continued)

(51) Int. Cl.
B60J 10/23 (2016.01)
B60R 13/04 (2006.01)
(Continued)

(52) U.S. Cl.
CPC .... B60R 13/0243 (2013.01); B29C 45/14409 (2013.01); B29C 45/14434 (2013.01);
(Continued)

(58) Field of Classification Search
CPC . B60J 10/16; B60J 10/004; B60J 10/15; B60J 10/45; B60J 10/23; B60J 10/70;
(Continued)

(56) References Cited

U.S. PATENT DOCUMENTS

RE21,769 E      4/1941   Tinnerman
3,922,460 A  *  11/1975  Jackson ................... B44C 5/04
                                                    428/122
(Continued)

FOREIGN PATENT DOCUMENTS

CN        1921997 A     2/2007
CN      201376273 Y     1/2010
(Continued)

OTHER PUBLICATIONS

International Search Report and Written Opinion for PCT/US2016/038373, dated Sep. 8, 2016, 12 pages.
(Continued)

*Primary Examiner* — Phi D A
(74) *Attorney, Agent, or Firm* — Howard & Howard Attorneys PLLC

(57) ABSTRACT

The subject invention includes a fixed window assembly for a vehicle comprising a fixed glass, a trim portion having a polymeric base and a decorative member bonded to the polymeric base. An encapsulation is coupled to the fixed glass and the polymeric base to mount the trim portion in a spaced and adjacent position relative to the fixed glass. A method of manufacturing is also provided using first and second molding apparatuses. Polymeric material is injected into a first mold cavity of the first molding apparatus to form the polymeric base bonded to the decorative member. Polymeric material is injected into a second mold cavity of the second molding apparatus to form the encapsulation coupled to the fixed glass and simultaneously coupled to the polymeric base to mount the trim portion in an adjacent position to the fixed glass.

11 Claims, 7 Drawing Sheets

Related U.S. Application Data

(60) Provisional application No. 62/181,844, filed on Jun. 19, 2015.

(51) Int. Cl.

| | | |
|---|---|---|
| *B60R 13/06* | (2006.01) | |
| *B60R 13/02* | (2006.01) | |
| *B29C 69/02* | (2006.01) | |
| *B29C 45/14* | (2006.01) | |
| *B60J 10/32* | (2016.01) | |
| *B60J 10/75* | (2016.01) | |
| *B29C 48/16* | (2019.01) | |
| *B60J 10/15* | (2016.01) | |
| *B60J 10/00* | (2016.01) | |
| *B60J 10/70* | (2016.01) | |
| *B60J 1/00* | (2006.01) | |
| *B60J 5/04* | (2006.01) | |
| B29C 48/00 | (2019.01) | |
| B29K 23/00 | (2006.01) | |
| B29K 709/08 | (2006.01) | |
| B29L 31/30 | (2006.01) | |

(52) U.S. Cl.
CPC .............. *B29C 48/16* (2019.02); *B29C 69/02* (2013.01); *B60J 1/004* (2013.01); *B60J 5/0402* (2013.01); *B60J 5/0463* (2013.01); *B60J 10/15* (2016.02); *B60J 10/23* (2016.02); *B60J 10/32* (2016.02); *B60J 10/45* (2016.02); *B60J 10/70* (2016.02); *B60J 10/75* (2016.02); *B60R 13/04* (2013.01); *B60R 13/06* (2013.01); *B29C 48/001* (2019.02); *B29K 2023/12* (2013.01); *B29K 2709/08* (2013.01); *B29L 2031/302* (2013.01); *B29L 2031/3052* (2013.01); *B60Y 2410/123* (2013.01)

(58) Field of Classification Search
CPC . B60J 1/004; B60J 5/0402; B60J 10/75; B60J 10/32; B60J 5/0463; B60R 13/06; B60R 13/0243; B60R 13/04; B29K 2023/12; B29C 45/14434; B29C 69/02; B29C 45/14409; B60Y 2410/123
See application file for complete search history.

(56) References Cited

U.S. PATENT DOCUMENTS

| | | | |
|---|---|---|---|
| 4,139,234 A | 2/1979 | Morgan | |
| 4,165,083 A * | 8/1979 | Dochnahl | B60J 10/265 277/637 |
| 4,248,933 A * | 2/1981 | Katoh | B32B 15/08 428/339 |
| 4,714,392 A | 12/1987 | Muller et al. | |
| 4,858,988 A | 8/1989 | Morgan et al. | |
| 4,953,907 A * | 9/1990 | Sugita | B60J 10/16 296/93 |
| 4,986,947 A | 1/1991 | Shigeki et al. | |
| 5,044,684 A * | 9/1991 | Yada | B60J 1/2002 296/93 |
| 5,112,101 A | 5/1992 | Katcherian et al. | |
| 5,137,323 A * | 8/1992 | Gross | B60J 10/16 296/93 |
| 5,139,302 A * | 8/1992 | Kanke | B60J 1/2002 296/201 |
| 5,139,307 A | 8/1992 | Koops et al. | |
| 5,338,087 A * | 8/1994 | Gross | B60J 10/17 296/146.15 |
| 5,395,579 A | 3/1995 | Fujihira et al. | |
| 5,424,019 A | 6/1995 | Miyakawa et al. | |
| 5,443,673 A | 8/1995 | Fisher et al. | |
| 5,491,624 A | 2/1996 | Levran et al. | |
| 5,522,191 A * | 6/1996 | Wenner | B60J 1/16 296/146.1 |
| 5,620,648 A * | 4/1997 | Volkmann | B29C 70/763 156/108 |
| 5,711,907 A | 1/1998 | Nozaki et al. | |
| 5,846,463 A | 12/1998 | Keeney et al. | |
| 6,264,869 B1 | 7/2001 | Notarpietro et al. | |
| 6,273,983 B1 * | 8/2001 | Miyakawa | B60J 10/17 156/244.13 |
| 6,447,130 B2 | 9/2002 | Chu | |
| 6,546,683 B1 * | 4/2003 | Senge | B60J 1/10 52/204.591 |
| 6,786,007 B2 | 9/2004 | Antake | |
| 7,582,243 B2 | 9/2009 | Kubo et al. | |
| 7,740,466 B2 | 6/2010 | Kubo | |
| 8,226,143 B2 | 7/2012 | Takeuchi et al. | |
| 8,262,968 B2 | 9/2012 | Smith et al. | |
| 8,304,060 B2 | 11/2012 | Katakura et al. | |
| 8,328,975 B2 | 12/2012 | Ruppert et al. | |
| 8,356,851 B2 | 1/2013 | Lange | |
| 8,549,790 B2 | 10/2013 | Murree et al. | |
| 8,765,041 B2 | 7/2014 | Minoura et al. | |
| 8,793,934 B2 | 8/2014 | Sato et al. | |
| 9,085,219 B2 | 7/2015 | Wade et al. | |
| 9,783,134 B2 | 10/2017 | Mori et al. | |
| 10,029,544 B2 | 7/2018 | Kramar et al. | |
| 2002/0096800 A1 | 7/2002 | Keeney et al. | |
| 2005/0006922 A1 * | 1/2005 | Mikkaichi | B60J 10/16 296/93 |
| 2005/0034411 A1 * | 2/2005 | Krause | B60J 10/78 52/717.01 |
| 2005/0084629 A1 | 4/2005 | Gopalan | |
| 2008/0001324 A1 | 1/2008 | Kubo | |
| 2010/0003523 A1 | 1/2010 | Sharygin et al. | |
| 2010/0148530 A1 | 6/2010 | Michler | |
| 2010/0186301 A1 | 7/2010 | Drozd et al. | |
| 2010/0294442 A1 | 11/2010 | Lange | |
| 2011/0187141 A1 | 8/2011 | Yanai et al. | |
| 2012/0021182 A1 | 1/2012 | Doan et al. | |
| 2012/0240473 A1 | 9/2012 | Minoura et al. | |
| 2013/0133267 A1 | 5/2013 | Kanazawa | |
| 2013/0232881 A1 * | 9/2013 | Adachi | B60J 10/16 49/490.1 |
| 2013/0292874 A1 | 11/2013 | Minoura et al. | |
| 2014/0312648 A1 | 10/2014 | Wade et al. | |
| 2016/0325609 A1 * | 11/2016 | Yu | B60J 10/70 |
| 2017/0100996 A1 | 4/2017 | Husek et al. | |

FOREIGN PATENT DOCUMENTS

| | | |
|---|---|---|
| CN | 103129485 A | 6/2013 |
| CN | 204109929 U | 1/2015 |
| CN | 204172665 U | 2/2015 |
| DE | 10 2010 034 340 A1 | 4/2012 |
| DE | 102010034340 A1 | 4/2012 |
| EP | 1688248 A1 | 8/2006 |
| EP | 2033760 A1 | 3/2009 |
| EP | 1737638 B1 | 6/2009 |
| EP | 2300519 A1 | 3/2011 |
| WO | WO9747456 A1 | 12/1997 |
| WO | WO 2010106868 A1 | 9/2010 |
| WO | WO2016205799 A1 | 12/2016 |
| WO | 2017132382 A1 | 8/2017 |

OTHER PUBLICATIONS

English language abstract for EP1737638 extracted from espacenet.com database Mar. 23, 2017, 2 pages.

English language abstract and computer-generated translation for CN204109929 extracted from espacenet.com database Mar. 23, 2017, 5 pages.

English language abstract and computer-generated translation for CN201376273 extracted from espacenet.com database Mar. 23, 2017, 5 pages.

English language abstract and computer-generated translation for EP2033760 extracted from espacenet.com database Mar. 23, 2017, 8 pages.

(56) References Cited

OTHER PUBLICATIONS

European Search Report and Written Opinion for European Patent Application No. 16204908 dated May 18, 2017; 7 pages.
English language abstract and machine-assisted English language translation of International Publication No. WO2010106868A1 extracted from www.espacenet.com on Nov. 2, 2017; 12 pages.
English language abstract and machine-assisted English language translation of Chinese Patent No. CN204172665U extracted from www.espacenet.com on Nov. 2, 2017; 15 pages.
Supplementary European Search Report for Application No. EP16812622 dated Jan. 14, 2019, 2 pages.
English language abstract for CN 1921997 A extracted from espacenet.com database on Jul. 22, 2019, 2 pages.
English language abstract for DE 10 2010 034 340 A1 extracted from espacenet.com database on Jul. 22, 2019, 1 page.
U.S. Appl. No. 16/408,024, filed May 9, 2019.
English language abstract for CN 103129485 A extracted from espacenet.com database on Feb. 3, 2020, 2 pages.

* cited by examiner

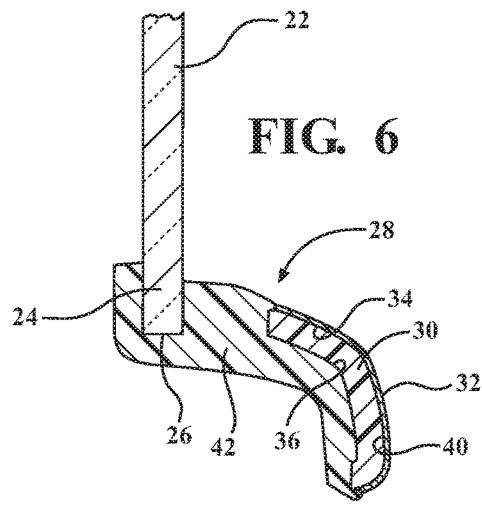
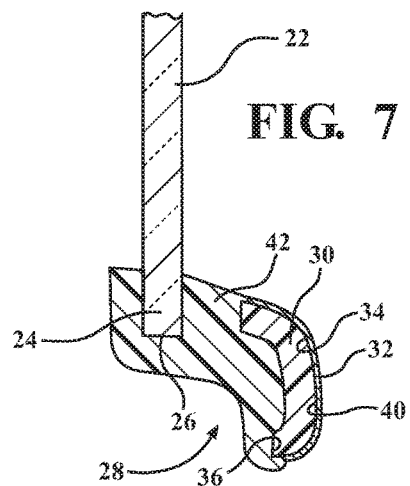
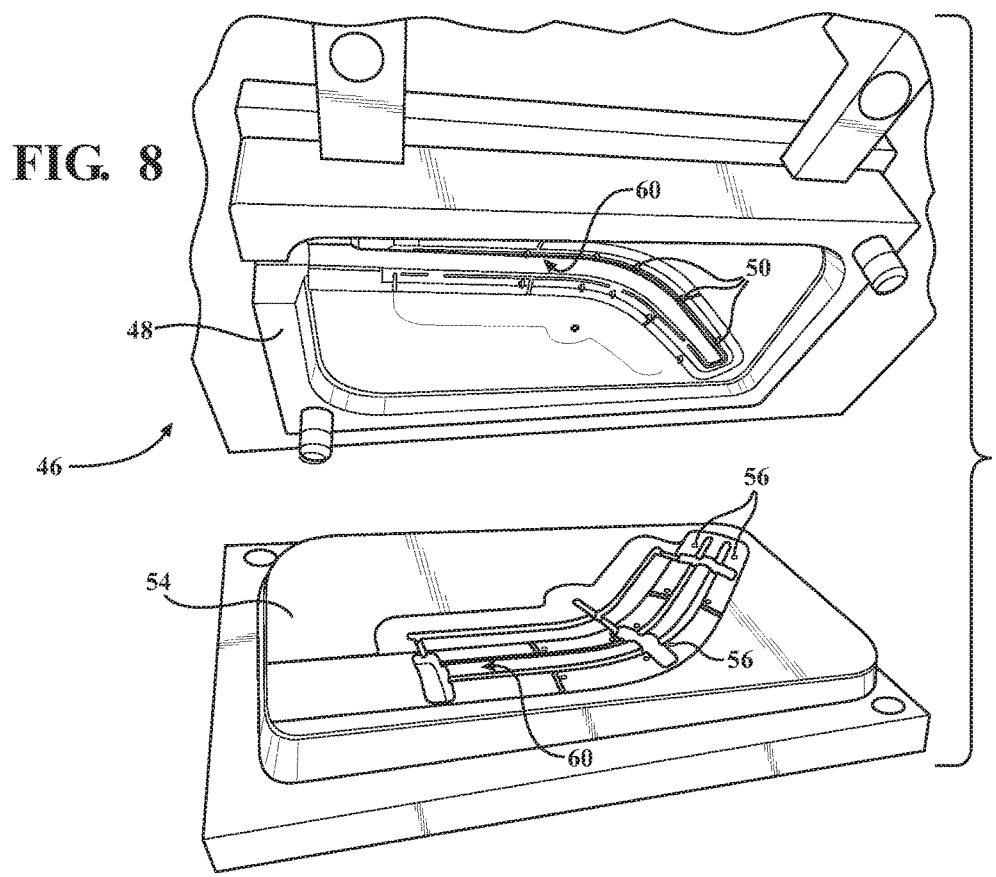

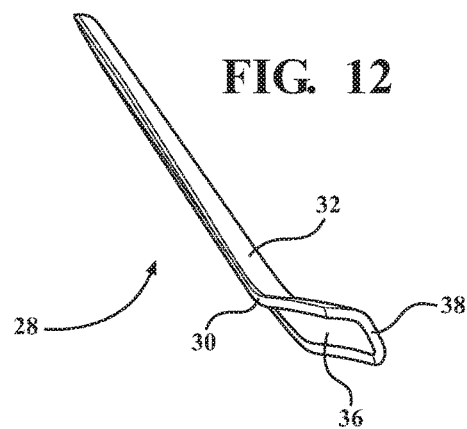
FIG. 12
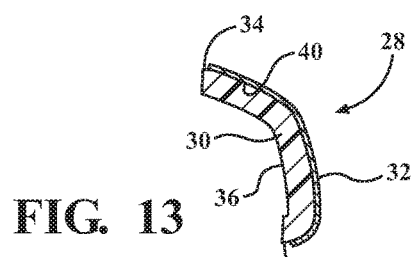
FIG. 13
FIG. 14
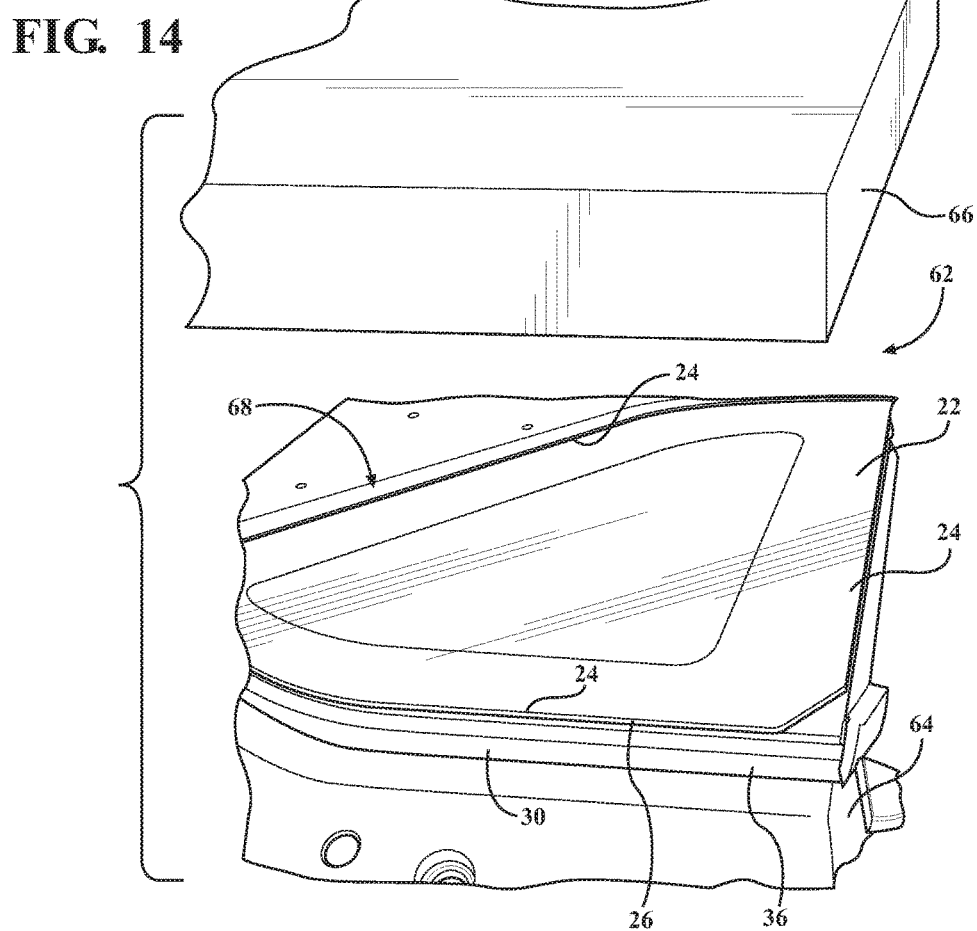

FIXED WINDOW ASSEMBLY FOR A VEHICLE AND METHOD OF MANUFACTURING SAME

CROSS-REFERENCE TO RELATED APPLICATIONS

The subject patent application is a continuation-in-part of co-pending International application No. PCT/US2016/038373, filed on Jun. 20, 2016, which claims priority to and all of the benefits of U.S. Provisional Patent Application No. 62/181,844, filed on Jun. 19, 2015, the disclosure(s) of which is/are hereby incorporated by reference.

BACKGROUND

1. Field of the Invention

The subject invention relates to a fixed window assembly for a vehicle and method of manufacturing the same.

2. Description of Related Art

Decorative trim is becoming increasingly popular for consumer vehicles, especially decorative trim having metallic, colored, or otherwise designed appearances. Decorative trim allows vehicle manufacturers to design vehicles having, for example, chrome-like trim and contributes an accented finish to visual design of the vehicles while providing sealing properties for windows of the vehicles. Applying sheets of thin metal to trim is expensive in terms of both material costs for sheets of thin metal and processing costs for bonding the metal to sealing elements of the trim. Conventional methods of applying decorative films to sealing elements of trim can also be cost inefficient, as the sealing elements are manufactured separately, and then the decorative film is applied separately. Thus, conventional techniques are inefficient in terms of both time and money.

SUMMARY

The subject invention includes a fixed window assembly for a vehicle comprising a fixed glass having a periphery. A trim portion is spaced from and adjacent to the fixed glass with the trim portion comprising a polymeric base formed of a polymeric material having an exterior surface and an interior surface, and a decorative member with a portion of the decorative member bonded to the exterior surface of the polymeric base. The assembly also including an encapsulation formed of a polymeric material with the encapsulation coupled to the periphery of the fixed glass and coupled to the interior surface of the polymeric base to mount the trim portion in the spaced and adjacent position relative to the fixed glass.

The subject invention also includes a method of manufacturing a fixed window assembly for a vehicle with the assembly having a fixed glass, an encapsulation and a trim portion, and the trim portion having a polymeric base and a decorative member. The method comprising the steps of mounting the decorative member in a first half of a first molding apparatus; moving a second half of the first molding apparatus into contact with the first half of the first molding apparatus to form a first mold cavity with the decorative member partially disposed within the first mold cavity; injecting a polymeric material into the first mold cavity to form the polymeric base within the first mold cavity with the polymeric base bonding to a portion of the decorative member to form the trim portion; removing the trim portion from the first molding apparatus; mounting the fixed glass in a first half of a second molding apparatus; positioning the trim portion in the first half of the second molding apparatus adjacent the fixed glass with the decorative member of the trim portion abutting the first half of the second molding apparatus such that the polymeric base faces outwardly from the first half of the second molding apparatus; moving a second half of the second molding apparatus into contact with the first half of the second molding apparatus to form a second mold cavity with the fixed glass and the polymeric base facing the second mold cavity; and injecting a polymeric material into the second mold cavity to form the encapsulation with the encapsulation coupled to a periphery of the fixed glass and simultaneously coupled to the polymeric base to mount the trim portion in the adjacent position to the fixed glass.

The assembly and method advantageously provide a time- and cost-effective fixed window assembly and a time- and cost-effective method of manufacturing the fixed window assembly. The decorative member is inexpensively applied to the fixed window assembly through a unique configuration and manufacturing technique.

BRIEF DESCRIPTION OF THE DRAWINGS

Advantages of the present invention will be readily appreciated, as the same becomes better understood by reference to the following detailed description, when considered in connection with the accompanying drawings.

FIG. 6 is a sectional view taken along line 6-6 of FIG. 5.

FIG. 7 is a sectional view taken along line 7-7 of FIG. 5.

FIG. 8 is a perspective view of a first molding apparatus.

FIG. 12 is another perspective view of the trim portion.

FIG. 13 is a sectional view taken along line 13-13 of FIG. 11.

FIG. 14 is a perspective view of a second molding apparatus.

DETAILED DESCRIPTION

Figure 1:
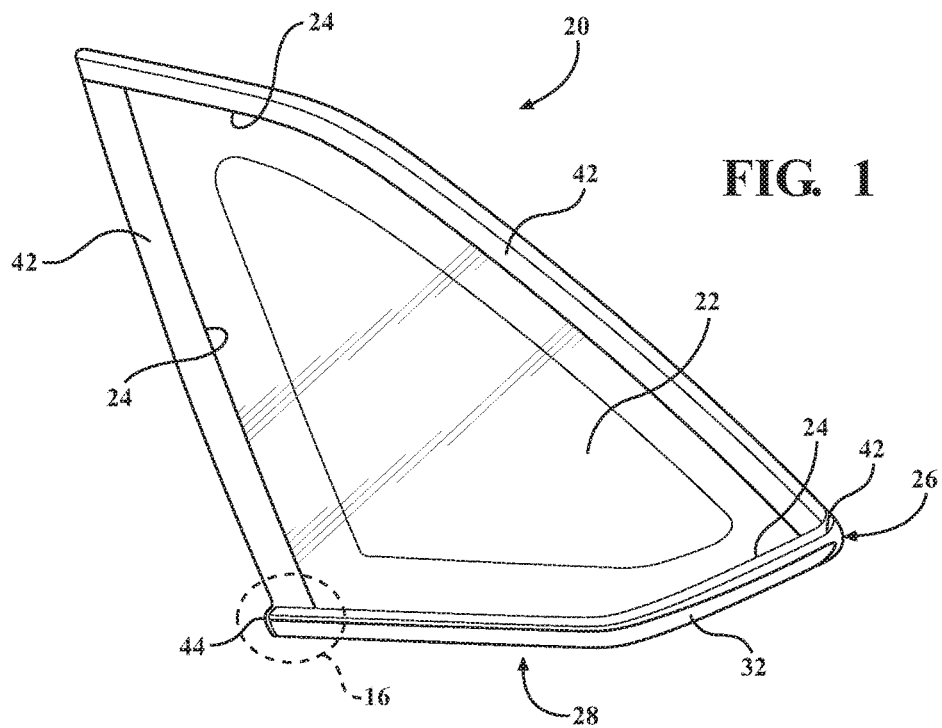
FIG. 1 is a perspective view of a fixed window assembly in accordance with the subject invention.

Referring to the Figures, wherein like numerals indicate like or corresponding parts throughout several views, aspects of a fixed window assembly 20 for a vehicle and method of manufacturing the same are provided. In particular, FIG. 1 illustrates an embodiment of the fixed window assembly 20 for the vehicle. As known to those skilled in the industry, fixed window assemblies can be mounted in various locations of the vehicle, including adjacent the A-pillar or C-pillar of the vehicle. The fixed windows can also be carried on a door of the vehicle. Other fixed windows include the rear window and accent windows of a vehicle. In the embodiment illustrated, the fixed window assembly 20 is a fixed side window mounted to a vehicle chassis that is unable to be raised, lowered, or otherwise moved, relative the vehicle. In some embodiments, the fixed window assembly 20 has a substantially trapezoidal or overall triangular configuration. In other embodiments, the fixed window assembly 20 can have a substantially rectangular configuration, or can be of any suitable shape.

As shown in FIGS. 1-7 and 14-15, the fixed window assembly 20 includes a fixed glass 22 having a periphery 24, with the periphery 24 defining a bottom edge 26 having opposing ends. As shown, the bottom edge 26 of the fixed glass 22 is curved between the ends to accommodate a desired design configuration of the vehicle. As also shown, the fixed glass 22 has a trapezoidal configuration to likewise accommodate a desired design. It is to be appreciated that the fixed glass 22 may be of any suitable configuration, any suitable material and may include tinting or other cosmetic features as known to those skilled in the art.

As best shown in FIGS. 1, 5-7, 9-13 and 15-16 the fixed window assembly 20 also includes a trim portion 28. Once mounted, as discussed in greater detail below, the trim portion 28, or trim strip, is spaced from, yet adjacent to the fixed glass 22. The trim portion 28 or strip extends along a desired periphery 24 of the fixed window. As shown, the trim portion 28 extends along the bottom edge 26 of the fixed window to provide a desired appearance along the bottom edge 26 of the fixed window. The trim portion 28 or trim strip comprises a polymeric base 30 and a decorative member 32, which define a molded trim as discussed in greater detail below.

The polymeric base 30 is formed of a polymeric material having an exterior surface 34 and an interior surface 36. Preferably, the polymeric base 30 is formed of a thermoplastic polymer to form a rigid polymeric base 30. Even more preferably, the polymeric base 30 is formed of a polypropylene to form the rigid polymeric base 30. The polymeric base 30 may also be a thermosetting polymer. It is to be appreciated that the polymeric base 30 may be formed of any suitable polymeric, or plastic-like, material.

As best shown in FIGS. 1, 9, 11-12 and 15-16, the polymeric base 30 further includes a terminal end 38 extending between the exterior 34 and interior 36 surfaces. As shown, at least the exterior surface 34 of the polymeric base 30 has an arcuate configuration. Preferably, the exterior 34 and interior 32 surfaces of the polymeric base 30 have arcuate configurations such that the polymeric base 30 is substantially uniform in thickness. As also shown, the trim portion 28 is formed in a curve complementary in configuration to the curve of the bottom edge 26. It is to be appreciated that the arcuate and/or curved configurations and/or configurations of the interior 36 and exterior 34 surfaces can change along the length of the polymeric base 30 to create a desired appearance. It is also to be appreciated that the polymeric base 30 may have any suitable configuration.

The decorative member 32, as shown in FIGS. 1, 5-7, 8A-13 and 16 is irremovably bonded to the polymeric base 30. Specifically, a portion of the decorative member 32 is bonded to the exterior surface 34 of the polymeric base 30. Preferably, the decorative member 32 is formed of a film having a bonding portion 40 with the exterior surface 34 of the polymeric base 30 bonded to the bonding portion 40. In the most preferred embodiment, the film is a thin, flexible sheet, or foil, of one or more materials that has a desirable appearance and is capable of adhesion or fusion bonding with a polymer. The decorative member 32 can be of an at least partially metallic material, an at least partially vinyl material or any other suitable material. Further, the decorative member 32 can have a chrome-like appearance, a wood-like appearance, a colored appearance, or be of any other suitable appearance. In other words, the decorative member 32 can be any material suitable for bonding to the polymeric base 30 with any desirable appearance. One example is known in the industry as a chrome foil. As mentioned above, the polymeric base 30 can have a curved configuration. As such, once bonded, the film would also have a curved configuration.

Figure 2:
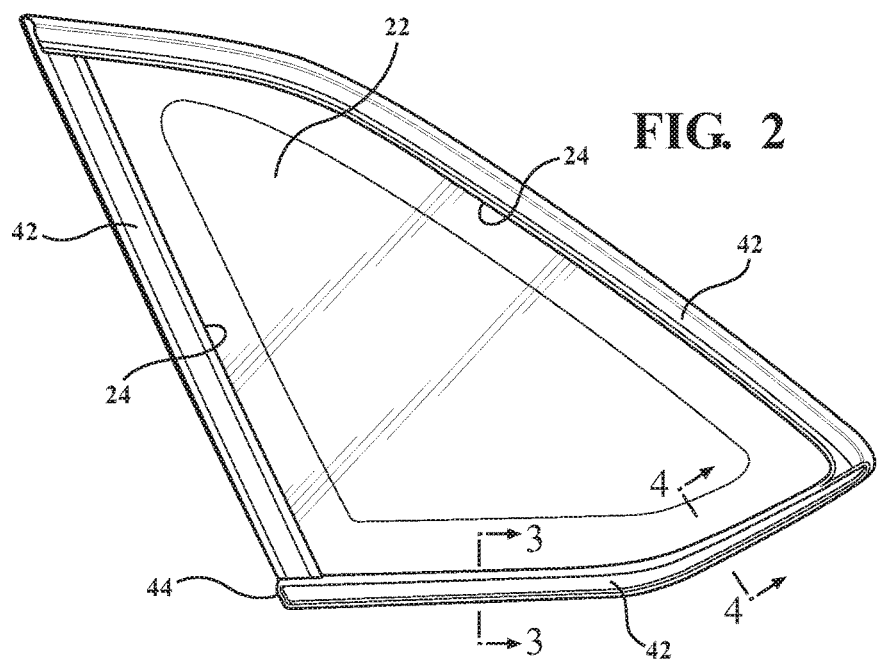
FIG. 2 is a perspective view of an encapsulation with a fixed glass.
Figure 3:
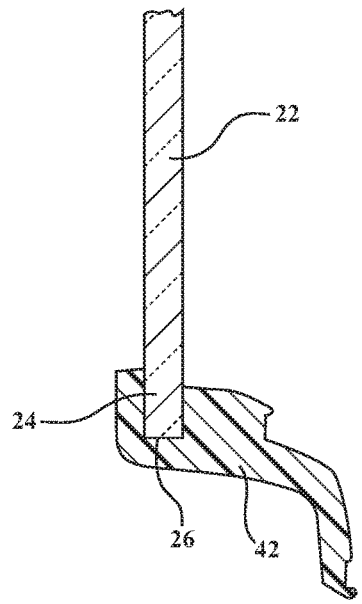
FIG. 3 is a sectional view taken along line 3-3 of FIG. 2.
Figure 4:
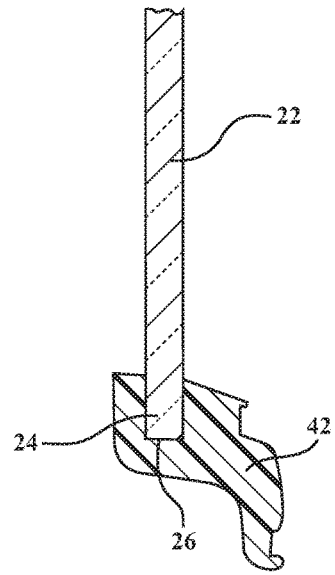
FIG. 4 is a sectional view taken along line 4-4 of FIG. 2.
Figure 5:
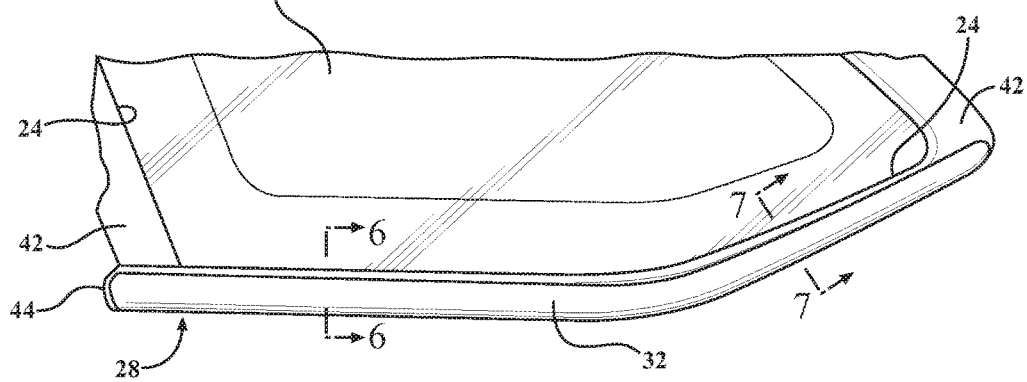
FIG. 5 is an enlarged fragmented view of a bottom edge of the fixed window assembly of FIG. 1.

Turning to FIGS. 1-7 and 15-16, an encapsulation 42, which is formed of a polymeric material, is coupled to the periphery 24 of the fixed glass 22. FIGS. 2-4 show the encapsulation 42 without the trim portion 28. It is to be appreciated that FIGS. 2-4 are provided for illustrative purposes to clearly identify mounting locations on the encapsulation 42 for the trim portion 28. As discussed in greater detail below, the encapsulation 42 is injected into a mold to mount the trim portion 28 to the fixed glass 22. As such, the configuration of the encapsulation 42 shown in FIGS. 2-4 would not actually occur in the manufacturing technique of the subject invention.

FIGS. 1, 5-7 and 15-16 illustrate the encapsulation 42 and the trim portion 28 with the encapsulation 42 coupled to the interior surface 36 of the polymeric base 30 to mount the trim portion 28 in the spaced and adjacent position relative to the fixed glass 22. Preferably, the encapsulation 42 is coupled to the periphery 24 of the fixed glass 22 and is simultaneously coupled to the polymeric base 30, through an overmolding process, to mount the trim portion 28 in the adjacent position to the fixed glass 22. The coupling/overmolding of the encapsulation 42 to the fixed glass 22 is best shown in FIGS. 3-4 and 6-7, and is known to those skilled in the art. The coupling/overmolding of the encapsulation 42 to the trim portion 28 is also shown best in FIGS. 3-4 (shows mounting locations without trim portion) and FIGS. 6-7 (shows overmolding of the trim portion). With specific reference to FIGS. 6-7, the encapsulation 42 is not only coupled to the interior surface of the polymeric base 30, but also encapsulates the sides of the polymeric base 30 and a portion of the exterior surface 34 of the polymeric base 30 to overmold and secure the trim portion 28 to the fixed glass 22. The coupling/overmolding creates a mechanical bond between the polymeric base 30 and the encapsulation 42, which can be in addition to any chemical bonding. The decorative member 32 can be trimmed in such a manner as to accommodate a desired mechanical bond/overmold between the polymeric base 30 and encapsulation 42. It is to be appreciated that the configuration of the encapsulation 42 and polymeric base 30 can vary to accommodate alternative mechanical connections.

As best shown in FIGS. 6-7, a portion of the encapsulation 42 is disposed between the fixed glass 22 and the trim portion 28 to interconnect the fixed glass 22 and the trim portion 28. In the embodiment shown, the trim portion 28 is specifically mounted adjacent the bottom edge 26 by this portion of the encapsulation 42. The encapsulation 42 may be of any suitable thickness or configuration.

The encapsulation 42 is formed of a thermoplastic polymer to form a rigid polymeric encapsulation 42. Preferably, the encapsulation 42 is formed of a thermoplastic vulcanizate to form a rigid polymeric encapsulation 42. It is to be appreciated that the encapsulation 42 may be formed of any suitable polymeric, plastic-like, material.

Figure 16:
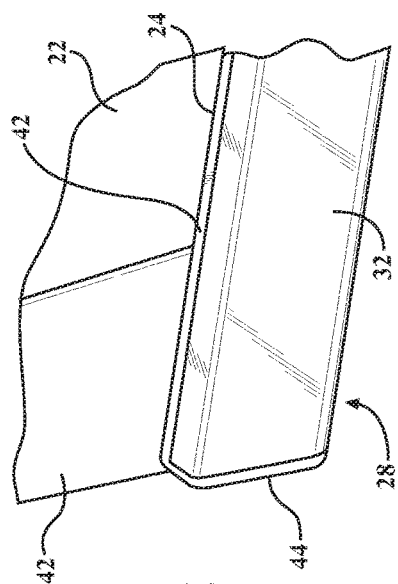
FIG. 16 is an enlarged fragmented view taken along line 16 of FIG. 1.

As mentioned above, the polymeric base 30 includes a terminal end 38 extending between the exterior 34 and interior 36 surfaces. As best shown in FIGS. 1 and 16, the encapsulation 42 is simultaneously coupled to the interior surface 36 of the polymeric base 30, the terminal end 38 of the polymeric base 30 and the periphery 24 of the fixed glass 22. The portion of the encapsulation 42 about the terminal end 38 creates an end cap 44 formed on the terminal end 38 of the polymeric base 30. The end cap 44 provides the end of the polymeric base 30 with a finished appearance, such that the trim portion 28 has a desirable appearance when the end of the trim portion 28 is exposed, such as when a vehicle door is opened.

The method of manufacturing the fixed window assembly 20 for the vehicle with the fixed glass 22, encapsulation 42 and trim portion 28 will now be discussed in greater detail. As shown in FIGS. 8 and 14, and as detailed below, the manufacturing technique of the subject invention utilizes two molding apparatuses.

Figure 8A:
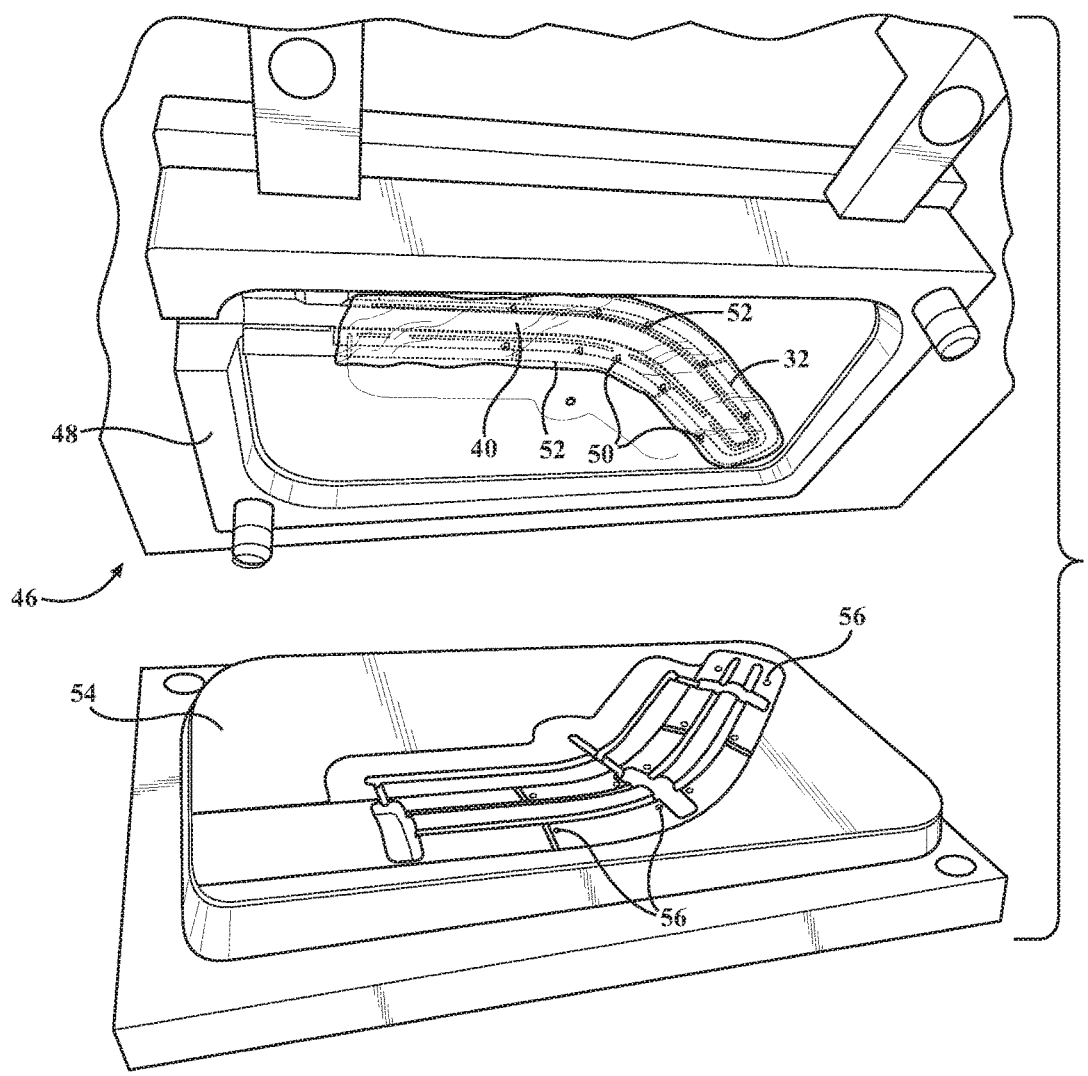
FIG. 8A is a perspective view of the first molding apparatus with a decorative member mounted thereto.

As shown in FIGS. 8 and 8A, the decorative member 32 is placed or mounted in a first half 48 of a first molding apparatus 46. The first molding apparatus 46 can be an injection molding machine of any suitable type. The first half 48 of the first molding apparatus 46 includes a plurality of pins 50. The step of mounting the decorative member 32 in the first half 48 of the first molding apparatus 46 includes the step of mounting the decorative member 32 about the pins 50. As mentioned above, the decorative member 32 can be formed of a film or other thin, flexible material. As such, the film is secured to the first molding apparatus 46 by puncturing the thin material through the plurality of pins 50. Preferably, the decorative member 32 has both the bonding portion 40 and excess portions 52. The step of mounting the decorative member 32 in the first half 48 of the first molding apparatus 46 includes the step of mounting the excess portions 52 of the decorative member 32 to the pins 50. Specifically, the excess portions 52 are pressed over the pins 50 to adequately hold the decorative member 32 in place.

Figure 10:
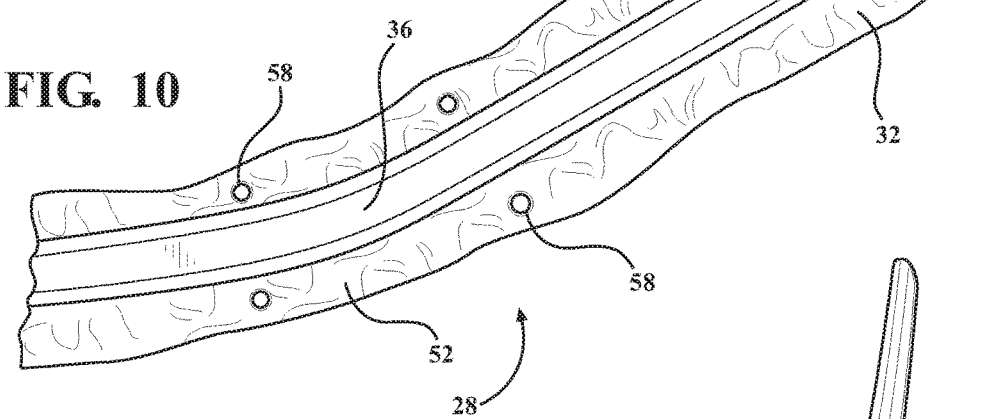
FIG. 10 is an enlarged fragmented view of the trim portion of FIG. 9.
Figure 11:
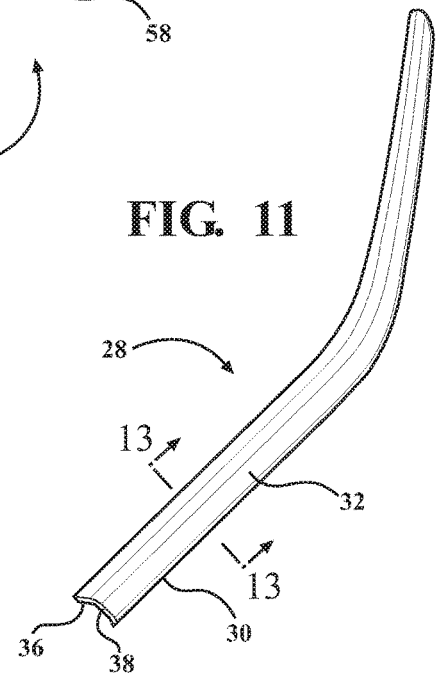
FIG. 11 is a perspective view of the trim portion.
Figure 15:
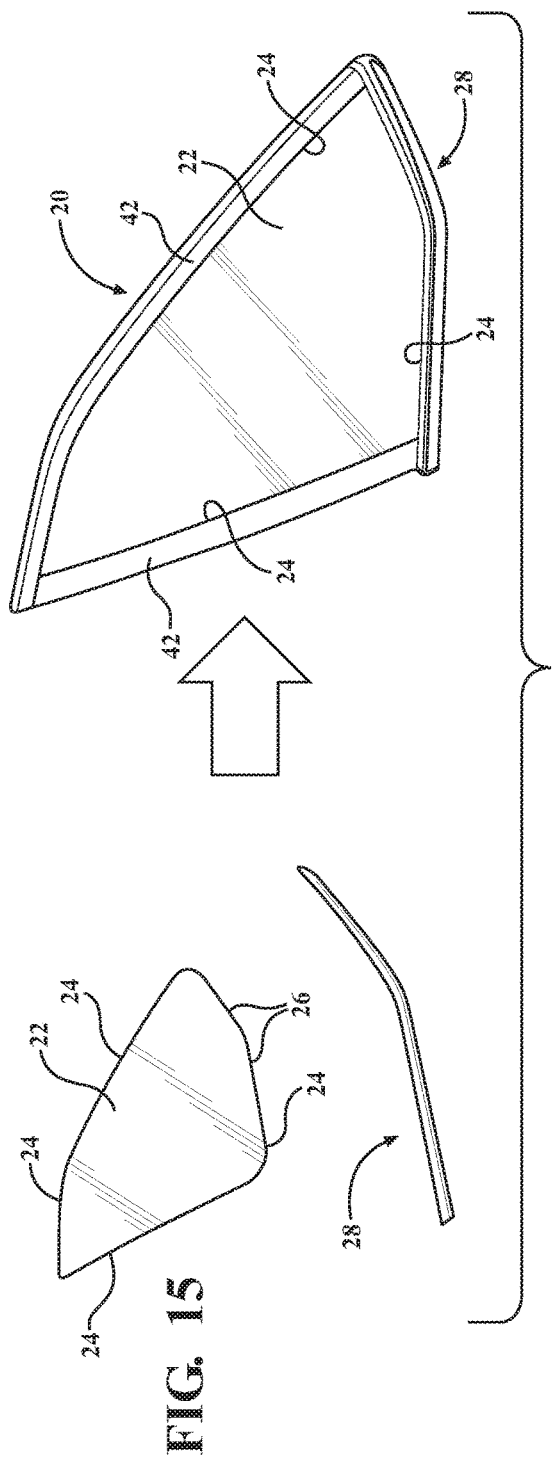
FIG. 15 is a schematic view of the manufacturing process.

A second half 54 of the first molding apparatus 46 includes a plurality of apertures 56, which are preferably aligned with the pins 50. As such, the method of manufacturing includes the step of inserting the pins 50 within the apertures 56 when the second half 54 of the first molding apparatus 46 contacts the first half 48 of the first molding apparatus 46. As shown in FIG. 10, pin holes 58 can be pre-formed in the decorative member 32 prior to locating the decorative member 32 about the pins 50. The pin and aperture arrangement properly secures the decorative member 32 within the first molding apparatus 46.

The second half 54 of the first molding apparatus 46 moves into contact with the first half 48 of the first molding apparatus 46 to form a first mold cavity 60 with the decorative member 32 partially disposed within the first mold cavity 60. In particular, the bonding portion 40 of the decorative member 32 is disposed within the first mold cavity 60 with the excess portions 52 remaining outside of the first mold cavity 60. As appreciated by those skilled in the art, the first mold cavity 60 can have any suitable configuration based on the desired shape of the polymeric base 30.

Figure 9:
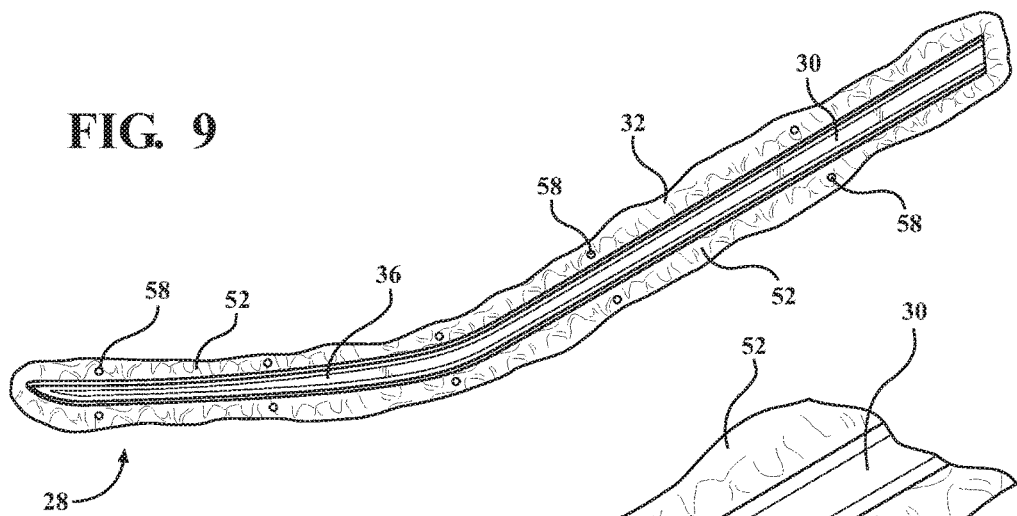
FIG. 9 is a perspective view of a trim portion.

A polymeric material is injected into the first mold cavity 60 to form the polymeric base 30 within the first mold cavity 60 with the polymeric base 30 bonding to a portion of the decorative member 32 to form the trim portion 28. In other words, the polymeric material is formed on and bonded with the decorative member 32 by injecting a polymer into the first mold cavity 60 with the polymer bonding to the bonding portion 40 of the decorative member 32. Preferably, a thermoplastic polymer is injected into the first mold cavity 60 to form a rigid polymeric base 30 bonded to a portion of the decorative member 32. Even more preferably, a polypropylene is injected into the first mold cavity 60 to form a rigid polymeric base 30 bonded to a portion of the decorative member 32. As mentioned above, the polymeric base 30 may have an arcuate configuration. As such, the step of injecting a polymeric material into the first mold cavity 60 to form the polymeric base 30 can be further defined as injecting a polymeric material into the first mold cavity 60 having an arcuate configuration to form an arcuate polymeric base 30 having an exterior surface 34 bonded to a portion of the decorative member 32 and an interior surface 36 suitable for coupling to the encapsulation 42 in a subsequent step. Further, the step of injecting a polymeric material into the first mold cavity 60 to form the polymeric base 30 can be further defined as injecting a polymeric material into the first mold cavity 60 to form the polymeric base 30 having an exterior surface 34, an opposing interior surface 36 and a terminal end 38 extending between the surfaces As shown in FIG. 9, the trim portion 28 is then removed from the first molding apparatus 46 once suitably cured as known to those skilled in the art. The excess portions 52 of the decorative member 32 are trimmed after being removed and before the step of positioning the trim portion 28 in a second molding apparatus 62 as discussed below. The excess portions 52 can be removed by any suitable method, such as cutting or shearing.

Turning to FIG. 14, the fixed glass 22 is separately mounted in a first half 64 of the second molding apparatus 62. The trim portion 28 is also positioned in the first half 64 of the second molding apparatus 62 adjacent the fixed glass 22. The decorative member 32 of the trim portion 28 abuts the first half 64 of the second molding apparatus 62 such that the polymeric base 30 faces outwardly from the first half 64 of the second molding apparatus 62. In other words, the trim portion 28 is installed in the second molding apparatus 62 with the exterior surface 34 facing the first half 64 of the second molding apparatus 62.

A second half 66 of the second molding apparatus 62 moves into contact with the first half 64 of the second molding apparatus 62 to form a second mold cavity 68 with the fixed glass 22 and the polymeric base 30 facing the second mold cavity 68. Specifically, the interior surface 36 of the polymeric base 38 faces the second mold cavity 68.

A polymeric material is injected into the second mold cavity 68 to form the encapsulation 42. As mentioned above, the encapsulation 42 is coupled to the periphery 24 of the fixed glass 22 and is simultaneously coupled to the polymeric base 30 to mount the trim portion 28 in the adjacent position to the fixed glass 22. Preferably, the step of injecting a polymeric material into the second mold cavity 68 to form the encapsulation 42 is further defined as injecting a thermoplastic polymer into the second mold cavity 68 to form a rigid polymeric encapsulation 42 simultaneously coupled to the periphery 24 of the fixed glass 22 and the rigid polymeric base 30. Even more preferably, the step of injecting a polymeric material into the second mold cavity 68 to form the encapsulation 42 is further defined as injecting a copolymer, such as thermoplastic vulcanizate (TPV), into the second mold cavity 68 to form a rigid polymeric encapsulation 42 simultaneously coupled to the periphery 24 of the fixed glass 22 and the rigid polymeric base 30. Further, the step of injecting a polymeric material into the second mold cavity 68 to form the encapsulation 42 can be further defined as injecting a polymeric material into the second mold cavity 68 to form the encapsulation 42 simultaneously coupled to the interior surface 36 of polymeric base 30, the terminal end 38 of the polymeric base 30 and the periphery 24 of the fixed glass 22.

The relative position of the trim portion 28 and fixed glass 22 can vary based on the application and the desired design, but is preferably positioned such that the encapsulation 42 is disposed between the fixed glass 22 and the trim portion 28 to interconnect the fixed glass 22 and trim portion 28. As best shown in FIGS. 6-7, the encapsulation 42 maintains a relative spacing between the fixed glass 22 and the trim portion 28.

The present invention has been described herein in an illustrative manner. It is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A fixed window assembly for a vehicle comprising:
a fixed glass having a first surface, an edge surface, and a second surface facing opposite said first surface, said fixed glass also having a periphery;
a trim portion spaced from and adjacent to said fixed glass with said trim portion comprising,
a rigid polymeric base comprising thermoplastic and having an exterior bonding surface and an interior bonding surface, and
a decorative member comprising film having a consistent cross-sectional thickness and having a bonding portion moldably bonded to an entirety of said exterior bonding surface of said rigid polymeric base; and
an encapsulation formed of a polymeric material with said encapsulation:
moldably bonded to said periphery of said fixed glass such that said polymeric material is bonded to a portion of said first surface, a portion of said edge surface, and a portion of said second surface; and
moldably bonded to said interior bonding surface of said rigid polymeric base by forming a depression in said encapsulation with said rigid polymeric base disposed in and bonded to said depression to mount said trim portion in said spaced and adjacent position relative to said fixed glass.

2. The fixed window assembly as set forth in claim 1 wherein a portion of said encapsulation is disposed between said fixed glass and said trim portion to interconnect said fixed glass and said trim portion.

3. The fixed window assembly as set forth in claim 2 wherein said fixed glass has a bottom edge and said trim portion is mounted adjacent said bottom edge by a portion of said encapsulation.

4. The fixed window assembly as set forth in claim 3 wherein said bottom edge has opposing ends and is curved between said ends with said trim portion formed in a curve complementary in configuration to said curve of said bottom edge.

5. The fixed window assembly as set forth in claim 1 wherein said encapsulation is formed of a thermoplastic polymer to form a rigid polymeric encapsulation.

6. The fixed window assembly as set forth in claim 1 wherein said rigid polymeric base is formed from polypropylene, and wherein said encapsulation is formed of a thermoplastic vulcanizate to form a rigid polymeric encapsulation.

7. The fixed window assembly as set forth in claim 1 wherein said exterior bonding surface of said rigid polymeric base has an arcuate configuration.

8. The fixed window assembly as set forth in claim 1 wherein said exterior and interior bonding surfaces of said rigid polymeric base have arcuate configurations such that said rigid polymeric base is substantially uniform in thickness.

9. The fixed window assembly as set forth in claim 1 wherein said polymeric rigid base further includes a terminal end extending between said exterior and interior bonding surfaces with said encapsulation simultaneously moldably bonded to said interior bonding surface of said rigid polymeric base, said terminal end of said rigid polymeric base, and said periphery of said fixed glass.

10. The fixed window assembly as set forth in claim 1 wherein said polymeric base has at least one side disposed between said exterior and interior bonding surfaces and wherein said encapsulation encapsulates said sides of said polymeric base to overmold and secure said trim portion to said fixed glass.

11. The fixed window assembly as set forth in claim 1 wherein said encapsulation is bonded to at least one of a portion of an exterior surface of said polymeric base and said decorative member to overmold and secure said trim portion to said fixed glass.

* * * * *